June 18, 1940.  W. STEIN  2,205,052
DEVICE FOR LOADING FILM CASETTES
Filed Feb. 12, 1936   2 Sheets-Sheet 1
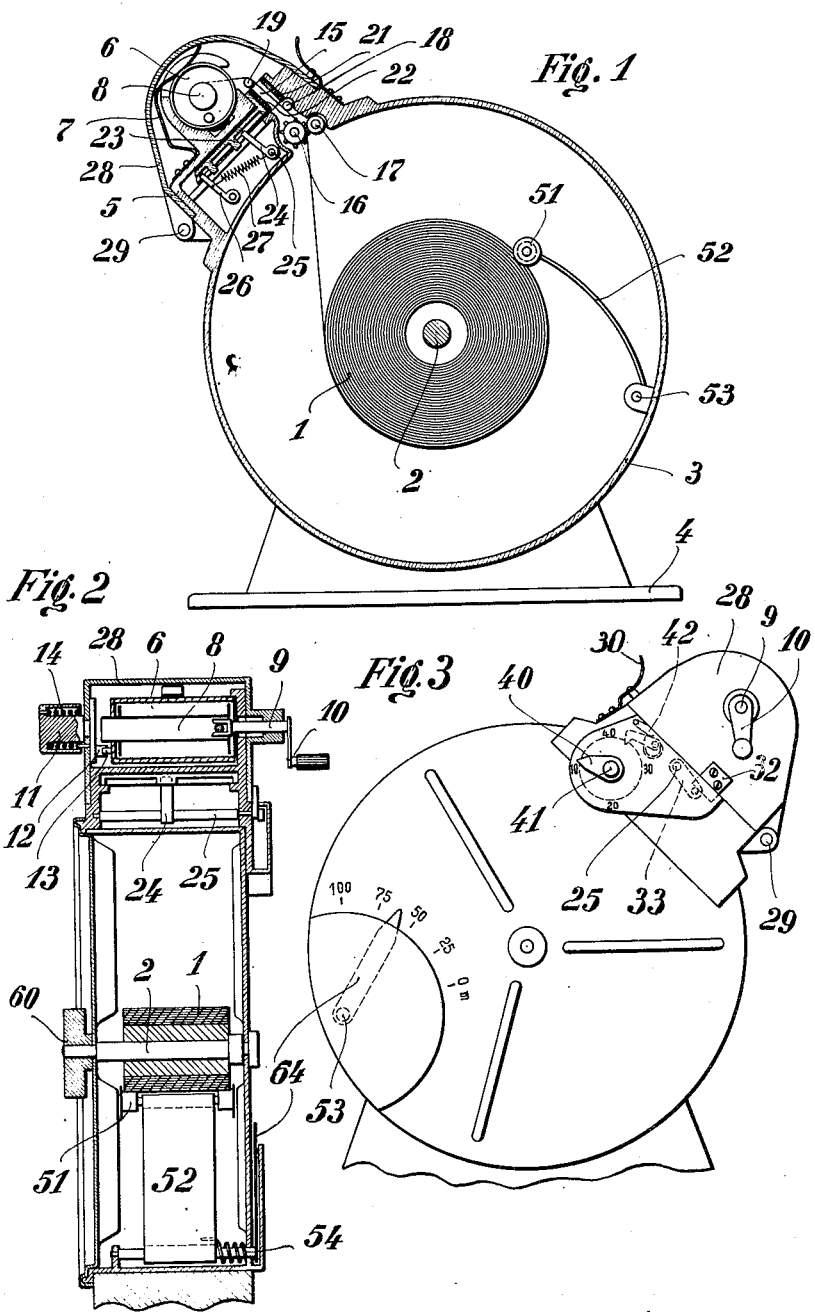
Willi Stein
INVENTOR
BY Ivan E. A. Konigsberg
ATTORNEY

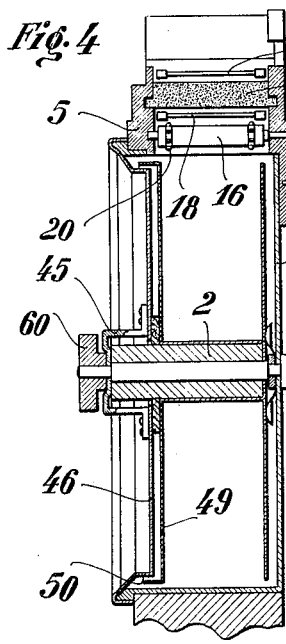
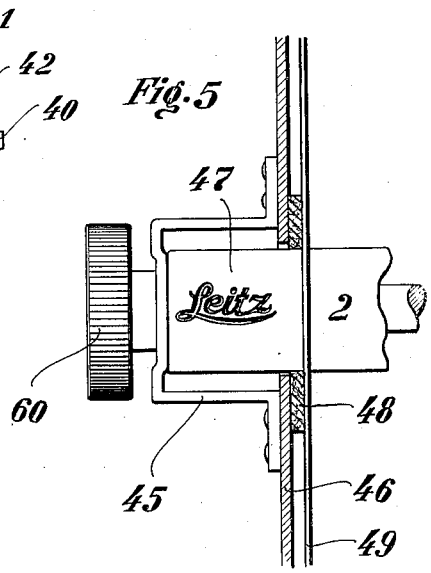
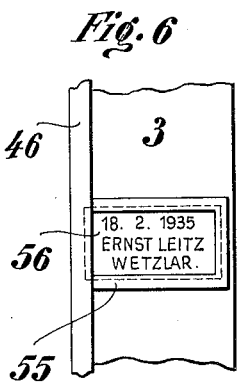
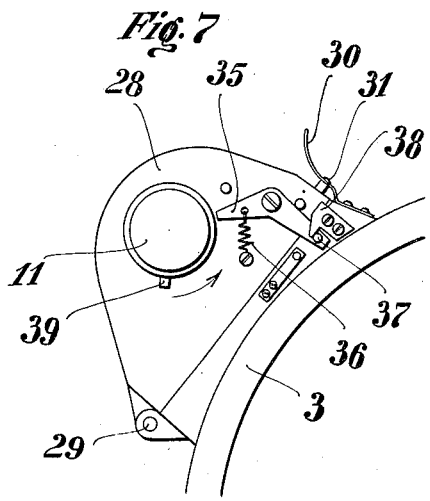

Patented June 18, 1940

2,205,052

UNITED STATES PATENT OFFICE 2,205,052

DEVICE FOR LOADING FILM CASETTES

Willi Stein, Wetzlar, Germany, assignor to Ernst Leitz, G. m. b. H., Wetzlar, Germany Application February 12, 1936, Serial No. 63,552
In Germany February 23, 1935

2 Claims. (Cl. 242—55)

This invention relates to a device for loading photographic film into a film camera casette. The object of the invention is to provide a large film container adapted to receive a film casette in position to receive film from the film container together with mechanism for loading the film casette by unwinding a portion of the film from the film container and winding it upon a spool in the casette. One object of the invention is to provide means whereby the film may be transferred from the container to the casette without danger of spoiling or scratching the film surface. Another object is to provide automatically functioning means whereby the device is made light-tight for daylight loading. Still another object is to provide a counting mechanism to determine the footage of transferred film and of the remaining film in the container. Other objects will appear as this specification proceeds. Accordingly the invention is embodied in a film loading device arranged and constructed as hereinafter set forth and as illustrated in the accompanying drawings in which Fig. 1 is a vertical sectional view of a film loading device embodying the invention.

Fig. 2 is a vertical sectional view taken at substantially a right angle to Figure 1.

Fig. 3 is a side view.

Fig. 4 is a view similar to Figure 2 illustrating different parts of the device.

Figs. 5 and 6 are detail views illustrating certain details relating to the marking and dating of the film.

Fig. 7 is an enlarged side view of parts of the closing mechanism.

The supply of film is in the form of a large roll or spool of film 1 which is carried upon a rotatable shaft 2 in a drum 3 having a foot 4. The drum carries a housing 5 adapted to receive a film casette 6 which is held in operative position by a spring 7. The film casette is of a well known construction which it is not necessary to describe or illustrate in detail except to state that it consists mainly of two interlocking cylinders forming a window through which the film enters the casette to be wound upon a spool 8 adapted to be engaged by a small shaft 9 journaled in the housing 5 and operated by a handle 10. The shaft 9 is axially movable into and out of engagement with the spool as clearly seen in Figure 2. When the casette is placed in the housing 5, the casette is opened so that the film can be threaded by hand upon the spool 8. Thereafter the casette is closed from the outside by means of a knob 11 having a lug 12 which engages a pin 13 in the casette. A spring 14 restores the knob 11 to starting position.

The film passes out of the drum 3 through a film canal 15 and is led between rollers 16 and 17, and over guide rollers 18 and 19, and into the casette. The rollers, see Figure 4, are arranged to engage only the edges of the film. The roller 16 is a feed roller having sprockets 20 for engaging the film perforations. The film canal is lined with pieces of plush 21 and 22 in order to exclude light from the drum when the device is open. The plush piece 21 is fixed against the canal wall, the plush piece 22 is carried by a slide 23 in the housing 5. The slide is moved into open position by an arm 24 on a shaft 25 to move the plush piece 22 away from the film and thereby open the film canal. Another pivoted arm 26 moves the slide into closed position, so that the two plush pieces are pressed together to close the film canal, by means of a spring 27. The housing is closed by a cap 28 pivoted at 29 and locked by a spring 30 engaging a small lug 31. On the outside of the cap, see Figure 3, there is a lug 32 which engages an arm 33 to operate the shaft 25.

When a casette is to be loaded the cap 28 is opened and the open casette placed in the housing. As soon as the cap opens the spring 27 pulls the arm 26 forward, to the right in Figure 1, to move the slide 23 into closing position to close the film canal before the cap is wholly opened as is clearly seen in the drawing. Thereafter the leading end of the film which projects from the film canal is inserted into the casette, the cap is closed and the lug 32 then engages the arm 33 to actuate the shaft 25 to operate the arm 24 to open up the film canal. This action is wholly automatic. The shaft 9 now is pushed into engagement with the casette spool 8 and the operator then turns handle 10 to load the casette. When this has been accomplished, the cap is opened, the film canal is automatically closed, the film cut off and the loaded casette removed.

Before the cap 28 can be opened it is necessary to operate the knob 11. To this end the cap 28 carries a bell crank 35 provided with a pin 37 which engages a fixed hook 38 on the housing. A spring 36 maintains the bell crank in locked engagement with a hook. In order to open the cap the knob 11 must be rotated anticlockwise to release the bell crank 35. When the knob 11 is operated the lug 12 engages the pin 13 in the casette to lock the same. This insures that the casette is closed when the cap is opened.

On the other side of the cap, Figure 3, there is a counter 40 on a shaft 41 which is operated by the film feed roller 16 by a suitable train of gearing 42, Figure 4. The counter measures the film footage in an obvious manner. There may be two counters measuring both the number of exposure frames as well as the footage. This detail is not shown.

The spool 2 in the drum may be lengthened as shown in Figure 4 and have a bearing 45 outside the drum secured to the detachable drum head 46. Upon the projecting part of the spool the name of the manufacturer may be placed as shown at 47 in Figure 5. A packing ring 48 may be placed in the film spool and the spool disk 49 may have an outturned flange 50 to protect the film against the light. Two rollers 51 may be kept in engagement with the spool of film 1 as in Figure 1. The rollers are carried by an arm 52 pivoted at 53 and a spring 54 may be provided to keep the rollers 51 upon the roll of film. Outside the housing there may be a counter 64 secured to the shaft 53 to indicate the remaining footage of film in the drum. Figure 6 shows a construction in which the drum 3 carries a holder 55 which is adapted to contain a marking plate 56 upon which may be printed the type of film, the date of manufacture etc. The plate is kept in the holder by the detachable drumhead 46. The drumhead 46 is closed tight by screwing up the knob 60 on the shaft 2.

The device herein disclosed provides a container for a supply of film, a housing or bearing for supporting a film casette, mechanism for transferring a portion of the film from the supply roll to the casette to load the latter under lighttight conditions and means for protecting the container against the entrance of light when a casette is to be inserted or removed. The entire mechanism is automatic except for the actual winding of the film into the casette.

I claim:

1. In combination a container containing undeveloped photographic film and having a film outlet, an open casette for receiving film from the container through said outlet, a cover on the container to be opened to place the casette in operative position adjacent said outlet, means for closing the outlet lighttight while the cover is opened, means for opening the outlet after the cover has been closed, means for transferring film through said outlet from the container into the casette, locking means for the cover, closing means for the casette, a member on the outside of the container for first actuating the casette closing means and thereafter unlocking the cover locking means and mechanism for operating said film transferring means.

2. In combination a container containing undeveloped photographic film and having a film outlet, an open casette for receiving film from the container through said outlet, a cover on the container to be opened to place the casette in operative position adjacent said outlet, automatic means for closing the outlet lighttight while the cover is opened, means actuated by the closing of the cover for opening the outlet after the cover has been closed, means for transferring film through said outlet from the container into the casette, locking means for the cover, closing means for the casette, a member on the outside of the container for first automatically actuating the casette closing means and thereafter automatically unlocking the cover locking means and mechanism for operating said film transferring means.

WILLI STEIN.